United States Patent [19]

Plate

[11] 4,131,503

[45] Dec. 26, 1978

[54] METHOD AND APPARATUS FOR SEALING AND CUTTING THERMOPLASTIC MATERIAL

[75] Inventor: Gary G. Plate, Burlington, Canada

[73] Assignee: A.T.R. Equipment Industries Ltd., Mississauga, Canada

[21] Appl. No.: 892,607

[22] Filed: Apr. 3, 1978

Related U.S. Application Data

[63] Continuation of Ser. No. 729,228, Oct. 4, 1976, abandoned.

[30] Foreign Application Priority Data

Sep. 2, 1976 [CA] Canada .................................. 260418

[51] Int. Cl.[2] ........................ B32B 31/18; B32B 31/20

[52] U.S. Cl. .................................... 156/250; 93/33 H; 93/35 R; 93/DIG. 1; 156/510; 156/530; 156/583

[58] Field of Search ............... 156/229, 250, 251, 495, 156/510, 530, 583, 515; 93/33 H, DIG. 1, 8 R, 35 R

[56] References Cited

U.S. PATENT DOCUMENTS

| | | | |
|---|---|---|---|
| 3,449,196 | 6/1969 | Yumoto et al. | 156/515 |
| 3,801,409 | 4/1974 | Plate et al. | 156/515 |
| 3,813,998 | 6/1974 | Lotto | 156/583 X |
| 3,980,516 | 9/1976 | Guard | 156/515 |
| 3,992,981 | 11/1976 | Stock | 93/33 H |

*Primary Examiner*—Michael G. Wityshyn
*Attorney, Agent, or Firm*—Arne I. Fors

[57] ABSTRACT

A sealing-cutting mechanism for use in a bag-making machine for manufacturing bags from thermoplastic material of tubular, flexible stock comprising an elongated heated sealing bar and an elongated heated blade mounted in side-by-side relation for independent reciprocal travel onto a support for sequentially cutting and sealing said thermoplastic material while supported under tension.

7 Claims, 4 Drawing Figures

METHOD AND APPARATUS FOR SEALING AND CUTTING THERMOPLASTIC MATERIAL

This is a continuation of application Ser. No. 729,228 filed Oct. 4, 1976, now abandoned.

BACKGROUND OF THE INVENTION

This invention relates to a bag-making machine and more particularly relates to an improved sealing-cutting mechanism in a machine for fabricating bags from thermoplastic material of tubular, flexible stock.

U.S. Pat. No. 3,801,409 issued Apr. 2, 1974 discloses a method and apparatus for forming bags from tubular feed stock of thermoplastic material such as polyethylene or polypropylene by heat and pressure sealing together the opposed sides of a flattened tube of said stock to form a bag bottom while substantially concurrently cutting said stock adjacent the seal for severing the preceding bag from the stock. Each newly formed bag must then be discharged from the bag-making machine and the stock advanced to the desired at-rest position for the next sealing-cutting operation.

This method described in the foregoing patent is directed to the sealing of the open end of tubular stock material and first discharging the resulting closed end from the machine. A desired length of the stock is then severed and the newly formed bag transported a short distance to a stacking bin by simple stacking wheels while the severed end of the stock material is concurrently heat-sealed for a repeat of the bag-making cycle.

A knife having a serrated cutting edge and adapted to reciprocate into and out of a mating recess disposed transversely of the direction of travel of the stock material normally is used to sever the newly formed bag prior to removal of the bag to a stacking bin. The knife edge must be maintained sharp and dulling of the components which make up the cutting edge can result in tearing of the bag material with shut-down of the bag-making process. Also, residue or torn material can jam the knife resulting in the cutting edge being deflected and broken with resulting machine shut-down.

It is an important object of the present invention to provide an improved method and apparatus for severing thermoplastic stock material which obviates the need for a sharp serrated cutting edge.

STATEMENT OF INVENTION

The method of the invention for sealing and cutting thermoplastic material of tubular, flexible stock in a bag-making machine comprises the steps of advancing a predetermined length of said flexible stock having a closed end onto a sealing roll, applying tension to said flexible stock, reciprocating a heated blade onto said tensioned stock on the said sealing roll for severing the stock to form a bag and removing said bag from the bag-making machine, and reciprocating a heated sealing bar onto the severed stock on the sealing roll in proximity to said blade for sealing the stock together to form a closed end.

The sealing-cutting apparatus of the invention for use in a bag-making machine for manufacturing bags from a thermoplastic material of tubular flexible stock comprises an elongated blade adapted for reciprocal travel onto a sealing roll on which said stock of thermoplastic material is carried; an elongated sealing bar mounted for reciprocal travel onto the sealing roll in proximity to said blade; means for heating said blade and means for heating said sealing bar; means for tensioning said stock material adapted to remove severed portions of stock material from the bag-making machine; and means for reciprocating said heating blade onto said stock material when said stock material is under tension for severing the stock material permitting removal of severed stock by said tensioning means and for sequentially reciprocating said heated sealing bar onto the stock material against the sealing roll for sealing the severed edge of the stock material.

BRIEF DESCRIPTION OF THE DRAWING

Other objects of my invention and the manner in which they can be attained will become apparent from the following detailed description of the accompanying drawing, in which.

Like reference characters refer to like parts throughout the description of the drawing.

DESCRIPTION OF THE PREFERRED EMBODIMENT

Figure 1:
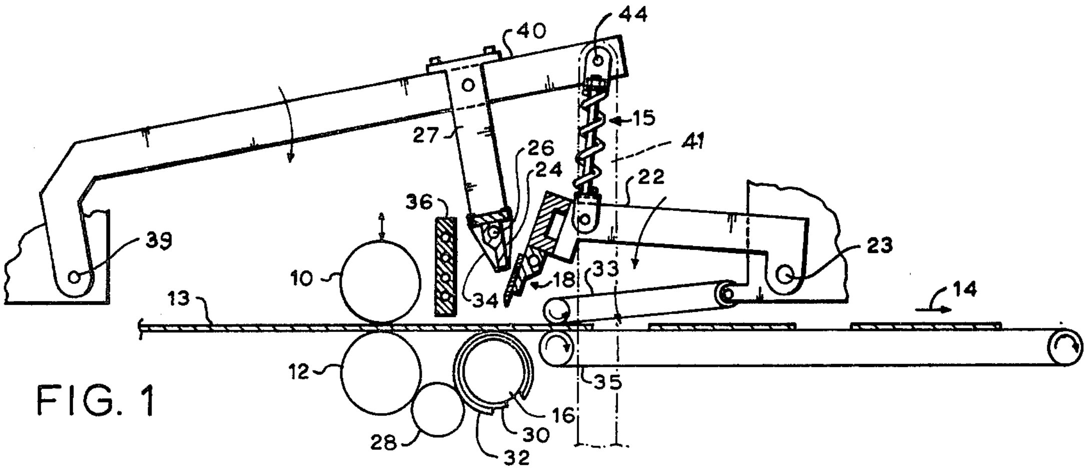
FIG. 1 is a side elevation, partly in section, of the sealing-cutting mechanism of the invention showing thermoplastic stock material under tension immediately prior to severing.
Figure 2:
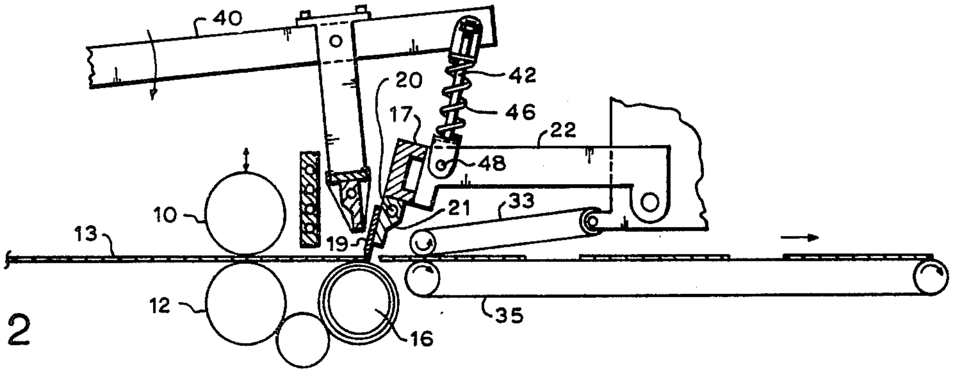
FIG. 2 is a side view of the apparatus of FIG. 1 at the time of severing.
Figure 3:
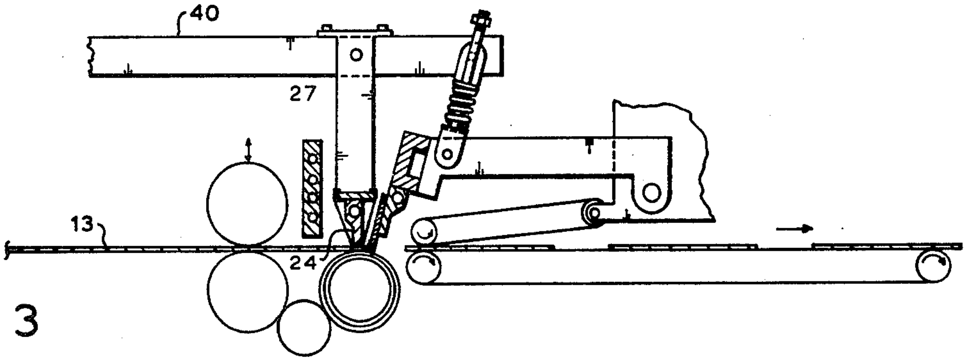
FIG. 3 is a side view of the apparatus of FIG. 1 immediately after severing during heat sealing of the thermoplastic stock material.
Figure 4:
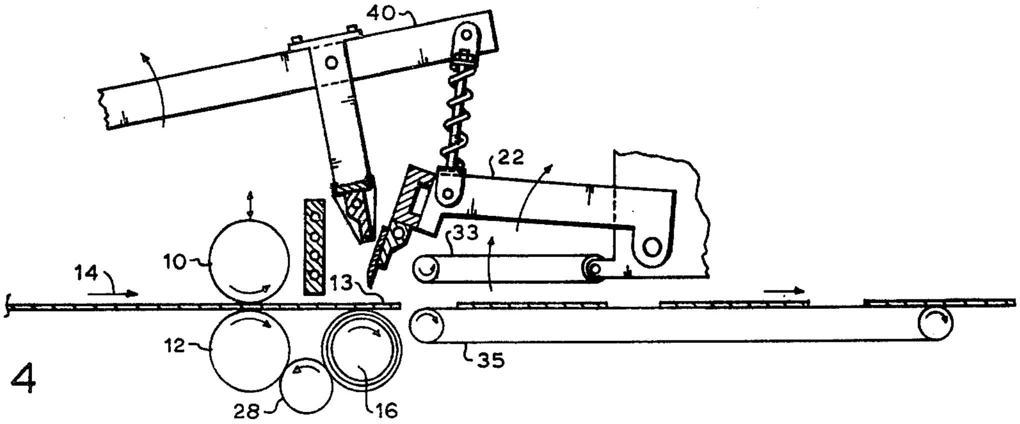
FIG. 4 is a side view of the apparatus of FIG. 1 during advance of the thermoplastic stock material preparatory to the severing step.

The sealing-cutting components of a bag-making machine illustrated in the drawing comprise drive roll 10 which is adjustably mounted for substantially vertical movement by, for example, a pneumatic cylinder assembly (not shown). The pressure of air supplied to the said pneumatic cylinder assembly controls the pressure of abutment between vertically adjustable upper draw roll 10 and stationary lower roll 12.

Thermoplastic stock material 13, i.e. heat-sealable plastics material such as polyethylene, polypropylene, and the like, travelling in the direction indicated by the arrow designated by numeral 14, passes between draw rolls 10,12 and over sealing roll 16, to be described in detail hereinbelow.

Elongated knife 18 comprises a single bevel, thin, steel-rule die blade 19 secured to heater bar 21 and is mounted for independent vertical reciprocal travel transversely to the travel 14 of stock material 13 onto and away from sealing roll 16 by reciprocating support bar 17. Heater bar 21 has a resistance element 20 passing therethrough for indirect heating of the blade 19 to a predetermined temperature.

Support bar 17 is resiliently carried at one end of arm 22 which is pivotally mounted at 23. Arm 22 in turn is connected to arm 40, pivotally mounted at 39, by linkage 15 which comprises rod 42 slidably mounted at one end for longitudinal movement in pivotal connector 44 mounted on arm 40 and pivotally mounted at the opposite end on arm 22 by connector 48. Stiff compression spring 46 coaxial with rod 42 biases arm 40 away from arm 22. The left end of arm 40, as shown in the drawings, is adapted for substantially vertical reciprocal travel about pivot axis 39 by control arm 41 secured thereto at connector 44, shown by ghost lines in FIG. 1, which is connected to drive means well known in the art.

An elongated sealing bar 24 having resistance element 26 passing therethrough for heating of the bar to a predetermined temperature is mounted transversely of the travel 14 of stock material 13 adjacent to knife blade 19 by support 27 rigidly connected to arm 40 for reciprocal movement onto and away from sealing roll 16 which is common to both blade 19 and sealing bar 24. Knife blade 19 is disposed at rest closer to roll 16 than sealing bar 14 such that blade 19 abuts roll 16 prior to abutment of the roll by sealing bar 24.

Sealing roll 16 comprises a steel roll journalled for rotation and driven concurrently for rotation with draw roll 10 by driven roll 12 and intermediate gear 28. Roll 16 is encased by heat resistant rubber sleeve 30 and is covered externally by a high temperature tape material 32 such as polytetrafluoroethylene sold under the trade mark "Teflon."

Sealing bar 24 has a sheet 34 of Teflon wrapped thereabout to obviate sticking of the bag material 13 to the sealing bar during the sealing operation. A water-cooled baffle 36 preferably is disposed intermediate sealing bar 24 and roll 10 to prevent heating of said roll due to the proximity of the roll to the heated sealing bar.

In operation, flattened thermoplastic stock material 13 travelling over sealing roll 16 in the direction of arrow 14 is stopped momentarily during the process of being discharged from the bag-making machine for severing of the newly formed bag and heat-sealing together of the two plies of the newly-severed forward end of the tubular stock material 13 prior to its discharge from the machine. The stock material 13 is maintained under continuous tension during severing by the drawing effect of abutting opposed conveyor belts 33,35 against the nip engagement by draw rolls 10,12, which are temporarily stopped during the severing and sealing operations. Blade 19, heated to a temperature in the range of from about 200 to 600° F., equal to the melting temperature of the thermoplastic material, preferably about 550° F., is first actuated into abutment against the stock material supported by sealing roll 16 by downward motion of arm 40 and depending arm 22 to compress spring 46 as blade 19 bears on roll 16. The two plies of stock material 13 are rapidly sequentially heated to the melting point of the material and, in that the stock material is maintained under tension, at the instant of heating by blade 19, the softening of the thermoplastic material immediately results in a severance of the bag portion from the stock material with the provision of sharp and clean bag edges which are not heat sealed together. The newly formed bag is withdrawn from the machine for stacking by conveyor belts 33,35.

Sealing bar 24 is reciprocated downwardly by activating arm 40 concurrently with the downward actuation of blade 19 by linkage 15 but, as will be evident from the drawing, blade 19 first abuts the stock material 13 on roll 16 to sever the said material and, as blade 19 abuts roll 16 compression of spring 46 permits continued downward motion of arm 27 and sealing bar 24 next abuts the edges of the two plies to heat-seal and newly severed edges of the stock material to form a bag bottom. The temperature of the sealing bar is maintained at a temperature in the range of 300° to 600° F., preferably about 450° F., to effectively weld the sides of the thermoplastic stock material together.

Lower conveyor 35 is travelling in a fixed horizontal plane and upper conveyor 33 is adapted to be raised from the lower conveyor to enable stock material to be loosely seated on lower conveyor 35 until shortly before initiation of the cutting and sealing cycle at which time upper conveyor 33 is lowered onto lower conveyor 35 to grip the stock material therebetween and to exert a positive tension on the sheet material as the heated blade makes contact therewith. The severed stock material, forming a bag of a desired length, is quickly withdrawn from the machine for stacking by conveyors 33,35 while sealing bar 24 seals the newly severed edges under no effective tension preparatory to advance of stock material, sealed end first, for operation of the next cutting-sealing cycle.

The present invention provides a number of important advantages. The use of serrated blades, guillotines and flyknives for cutting stock material is no longer required and problems of jamming, breakage and the need for attendant service and maintenance due to shutdowns is effectively minimized.

It will be understood, of course, that modifications can be made in the embodiment of the invention illustrated and described herein without departing from the scope and purview of the invention as defined by the appended claims.

What I claim as new and desire to protect by Letters Patent of the United States is:

1. A method for sealing and cutting thermoplastic material of tubular, flexible stock in a bag-making machine comprising the steps of intermittently advancing a predetermined length of said flexible stock having a closed end onto a sealing roll, applying tension to said flexible stock, reciprocating a blade heated to the melting temperature of the thermoplastic material onto said tensioned stock on the said sealing roll while said stock and sealing roll are momentarily at rest for severing the stock to form a bag and removing said bag from the bag-making machine, and independently reciprocating a heated sealing bar onto the severed stock on the sealing roll while said stock is under no effective tension in proximity to said blade for sealing the stock together to form a closed end.

2. A sealing-cutting mechanism for use in a bag-making machine for manufacturing bags from a thermoplastic material of flexible tubular stock comprising, in combination: a sealing roll mounted on said machine for intermittent rotation adapted to receive said stock thereon, a first pivot arm and a blade mounted on said first pivot arm for reciprocal movement of the blade onto and away from the stock on the roll, means for heating said blade, a second pivot arm and a sealing bar mounted on said second pivot arm for reciprocal movement of the sealing bar onto and away from the stock on the roll, means for heating said sealing bar, biasing means interconnecting said first and second pivot arms such that the blade is normally disposed lower than the sealing bar whereby downward actuation of the second pivot arm depresses the first pivot arm for sequential abutment of the blade and of the sealing bar on the stock, means for tensioning said stock material adapted to remove severed portions of stock material from the bag-making machine, and means for actuating said pivot arms for abutment of the blade when heated onto said stock material when said stock material is under tension for severing the stock material permitting removal of severed stock by said tensioning means and for sequential abutment of the sealing bar when heated onto the stock material against the sealing roll for sealing the severed edge of the stock material while said stock material is under no effective tension.

3. A mechanism as claimed in claim 2 in which said tensioning means comprises a pair of opposed conveyor belts adapted to be moved from a spaced-apart position to an abutting position for receiving the thermoplastic material therebetween and for advancing said material a predetermined length until said material is tensioned and severed by abutment of said heated blade therewith while under tension.

4. A mechanism as claimed in claim 2 in which said sealing roll comprises a steel roll journalled for rotation, a heat resistant rubber sleeve encasing said roll, and an external cover of polytetrafluorethylene.

5. A mechanism as claimed in claim 4, means for heating said blade to a temperature within the range of 200° to 600° F.

6. A sealing-cutting mechanism as claimed in claim 2 in which said biasing means comprises a rod pivotally mounted at one end on one of said pivot arms and slidably and pivotally mounted at the other end for longitudinal movement on the other said pivot arms, and a compression spring co-axial with said rod interposed between said arms whereby said arms are biased away from each other.

7. A mechanism as claimed in claim 6 in which said first and second pivot arms are opposed to each other and said second pivot arm is downwardly actuated by substantially vertical reciprocal travel of a control arm secured thereto.

* * * * *